United States Patent [19]
Gardner

[11] 3,878,261

[45] Apr. 15, 1975

[54] HYDROISOMERIZATION OF PARAFFIN HYDROCARBON WITH A SUPPORTED CATALYST OF $SBF_5$ AND $CF_3SO_3H$

[75] Inventor: Lloyd E. Gardner, Bartlesville, Okla.

[73] Assignee: Phillips Petroleum Company, Bartlesville, Okla.

[22] Filed: Aug. 24, 1973

[21] Appl. No.: 391,477

[52] U.S. Cl. .......................................... 260/683.68
[51] Int. Cl. ............................................... C07c 5/28
[58] Field of Search ........... 260/683.68, 666 P, 676

[56] References Cited
UNITED STATES PATENTS
3,766,286    10/1973    Olah .............................. 260/683.68

Primary Examiner—Delbert E. Gantz
Assistant Examiner—G. J. Crasanakis

[57] ABSTRACT

A method of isomerizing paraffins containing four to 12 carbon atoms contained in a feedstream by passing the feedstream into contact with hydrogen and with a catalyst consisting of supported $SbF_5$ and $CF_3SO_3H$.

9 Claims, No Drawings

HYDROISOMERIZATION OF PARAFFIN HYDROCARBON WITH A SUPPORTED CATALYST OF SbF$_5$ AND CF$_3$SO$_3$H

This invention relates to super acid catalysts.

In one of its more specific aspects, this invention relates to the employment of a supported super acid catalyst such as SbF$_5$ in combination with CF$_3$SO$_3$H to isomerize C$_4$ to C$_{12}$ paraffins.

The isomerization of paraffins employing acids is well known. The present invention employs the super acid SbF$_5$ and CF$_3$SO$_3$H in its supported form, the supports being selected from the group consisting of fluorided alumina, potassium fluoride on alumina, sodium fluoride, aluminum phosphate, aluminum fluoride, charcoal and the like.

The supported super acid catalyst of the present invention can be employed in n-heptane isomerization to give a higher ratio of 2,2,3-trimethylbutane to methyl hexanes than can be obtained by the use of supported SbF$_5$/HF super acid catalysts. Paraffins suitable for the present invention include C$_4$ to C$_{12}$ alkanes, C$_5$ to C$_8$ alkanes being preferred.

While isomerization with acid catalysts can be carried out with the catalyst in the liquid phase, isomerization can be more easily carried out with the catalyst in the supported state. The use of the supported state tends to enable the employment of shorter contact times, while retaining the acid within a smaller portion of the system. For example, employment of the acid in the supported phase eliminates the need for agitator systems, separation drums, acid recirculation systems and the like. Further, there are advantages in handling the catalyst in a supported state over handling it in a liquid state since less acid is employed. The supported catalyst can be formed within the system in which it is to be employed and there is less difficulty in combating corrosion within the system and disposing of the spent catalyst.

The catalyst of the present invention can be prepared by contacting any suitable support with liquid trifluoromethanesonic acid and with antimony pentafluoride. Either component can be added first or they can be added simultaneously. Preferably, the support is positioned in a bed and the liquid CF$_3$SO$_3$H is passed downward into contact with the support in a stream of helium to facilitate the distribution of the acid on the surface of the support. Antimony pentafluoride vapor in helium diluent is then passed through the ractor to form the supported SbF$_5$ and CF$_3$SO$_3$H complex catalyst. The helium stream is continued to remove any excess acid from the system.

The present process can be carried out under the following conditions:

As is well known in the art, naphthenes are used as cracking suppressor in acid catalyzed paraffin isomerization procedures. Such suppressors can constitute 0.1 to 80 mole percent of hydrocarbon feedstocks used in isomerization processes.

The process of thid invention is demonstrated by the following examples.

EXAMPLE I

A 13.37 g sample of fluorided alumina, containing 39.8 weight percent fluorine, was placed in a nickel tube reactor and after treatment with trifluoromethanesulfonic acid in a helium stream, the contents of the reactor showed a gain of 2.68 g, indicating the absorption of 0.0178 mole of CF$_3$SO$_3$H. The reactor contents were then treated with a helium-diluted stream of antimony pentafluoride until the system showed a weight gain of 4.19 g corresponding to the absorption of 0.0193 mole SbF$_5$. This catalyst composite contained 33.9 weight percent total of SbF$_5$ and CF$_3$SO$_3$H based on the total weight of the supported composition.

Normal-heptane isomerization was carried out employing the above supported catalyst at 24°C, about one atmosphere, 16.2 H$_2$/n-C$_7$ molar ratio, and a gaseous space velocity of 618 V/V/hr. The charge contained 17.0 mole percent methlcyclohexane based on total hydrocarbon in the feedstock.

The total reactor effluent collected over a reaction period of 230 minutes was analyzed on a glc capillary column and the results were as follows:

TABLE I

| Reactor Effluent Components | Weight % |
| --- | --- |
| n-heptane | 54.02 |
| (C$_3$+C$_4$+C$_5$+C$_6$) | 16.90 |
| 2,2-dimethylpentane | 1.04 |
| 2,4-dimethylpentane | 7.25 |
| 2,2,3-trimethylbutane | 2.30 |
| 3,3-dimethylpentane | 1.28 |
| 2-methylhexane | 6.77 |
| 2,3-dimethylpentane | 2.72 |
| 3-methylhexane | 4.33 |
| C$_8$ | 3.39 |

From the above, the weight ratio of 2,2,3-trimethylbutane to methylhexanes is 0.2.

EXAMPLE II

A 14.06 g sample of fluorided alumina was placed in a nickel tube reactor and treated with trifluoromethanesulfonic acid in a helium purge until the contents of the reactor showed a weight gain of 3.64 g indicating

| Parameter | Approximate Ranges Suitable | Preferred |
| --- | --- | --- |
| Temperature, °C | −80 to 100 | 0 to 35 |
| Pressure (Atm.) | 0.1 to 70 | 1 to 5 |
| Gaseous Space Velocity (Volumes of gaseous feed/ Volume of Catalyst/Hour) | 5 to 5000 | 200 to 1000 |
| Molar Ratio of H$_2$/ Hydrocarbon in feedstock | 0.1 to 100 | 1 to 20 |
| Weight % of the total of SbF$_5$ and CF$_3$SO$_3$H based on the total weight of the supported composition | 1 to 40 | 15 to 35 |
| Molar Ratio of SbF$_5$/CF$_3$SO$_3$H on the support | 0.1:1 to 1.5:1 | 0.3:1 to 1.3:1 | the absorption of 0.0242 mole of $CF_3SO_3H$. The reactor contents were then treated with a helium-diluted stream of antimony pentafluoride until the system showed a weight gain of 2.29 g corresponding to the absorption of 0.0105 mole $SbF_5$. This catalyst composite then contained 29.7 weight percent total of $SbF_5$ and $CF_3SO_3H$ based on the total weight of the supported composition.

Normal-heptane isomerization run was carried out over the above supported catalyst at about 0°C, about 1 atmosphere, 16.0 $H_2$/n-$C_7$ molar ratio, and a gaseous space velocity of 600 V/V/hr. The charge contained 18.9 mole percent of methylcyclohexane based on total hydrocarbon in the feedstock.

The total reactor effluent collected over a reaction period of 195 minutes was analyzed on a glc capillary column and the results were as follows:

TABLE II

| Reactor Effluent components | Weight % |
|---|---|
| n-heptane | 87.60 |
| ($C_3+C_4+C_5+C_6$) | 0.51 |
| 2,2-dimethylpentane | 0.23 |
| 2,4-dimenthypentane | 3.33 |
| 2,2,3-trimethylbutane | 0.80 |
| 3,3-dimethylpentane | 0.30 |
| 2-methylhexane | 3.27 |
| 2,3-dimethylpentane | 1.20 |
| 3-methylhexane | 1.44 |
| $C_8$ | 0.77 |

From the above, the ratio of 2,2,3-trimethylbutane to methylhexanes is 0.17.

EXAMPLE III

A 12.20 g sample of fluorided alumina was placed in a nickel tube reactor and purged with dry nitrogen. Freshly distilled antimony pentafluoride was vaporized into the reactor in a stream of helium at a temperature of 25°C. A stream of HF vapor in helium diluent was then passed through the reactor to form the $SbF_5$ and HF supported super acid catalyst. Approximately 1.27 g total of the $SbF_5$ and HF were absorbed to produce a catalyst containing 9.5 weight percent total of $SbF_5$ and HF based on the total weight of the supported composition.

Isomerization of normal heptane over the above $SbF_5$ and HF catalyst on fluorided alumina at 23°C, 1.0 atmosphere, 17.3 $H_2$/n-$C_7$ molar ratio, and a gaseous space velocity of 606 V/V/hr gave the results shown in Table III. The charge contained 18 mole percent methylcyclohexane based on total hydrocarbon in the feedstock. The results shown in Table III are based on capillary glc analysis of the total reactor effluent collected during a reaction period of 425 minutes.

TABLE III

| Reactor Effluent Components | Weight % |
|---|---|
| n-heptane | 65.36 |
| ($C_3+C_4+C_5+C_6$) | 0.43 |
| 2,2-dimethylpentane | 0.58 |
| 2,4-dimethylpentane | 9.34 |
| 2,2,3-trimethylbutane | 1.85 |
| 3,3-dimethylpentane | 0.83 |
| 2-methylhexane | 10.41 |
| 2,3-dimethylpentane | 3.72 |
| 3-methylhexane | 6.68 |
| 3-ethylpentane | 0.64 |
| $C_8$ | 0.16 |

From the above, the weight percent ratio of 2,2,3-trimethylbutane to methylhexanes is about 0.11.

EXAMPLE IV

A supported $SbF_5$ and HF catalyst on fluorided alumina was prepared as described in Example III. This catalyst contained 11.0 weight percent total of $SbF_5$ and HF based on the total weight of the supported composition.

A normal heptane isomerization run was carried out over the above supported catalyst at about 0°C, 1.0 atmosphere, 15.8 $H_2$/n-$C_7$ molar ratio, and a gaseous space velocity of 606 V/V/hr. The charge contained 18 mole percent methylcyclohexane based on total hydrocarbon in the feedstock.

The total reactor effluent collected over a reaction period of 345 minutes was analyzed on a glc capillary column and the results were as follows:

TABLE IV

| Reactor Effluent Components | Weight % |
|---|---|
| n-heptane | 52.63 |
| ($C_3+C_4+C_5+C_6$) | 0.28 |
| 2,2-dimethylpentane | 1.41 |
| 2,4-dimethylpentane | 12.91 |
| 2,2,3-trimethylbutane | 1.80 |
| 3,3-dimethylpentane | 2.28 |
| 2-methylhexane | 14.76 |
| 2,3-dimethylpentane | 4.20 |
| 3-methylhexane | 8.68 |
| 3-ethylpentane | 0.41 |
| $C_8$ | 0.56 |

From the above, the ratio of 2,2,3-trimethylbutane to methylhexanes is about 0.08.

On the basis of the foregoing examples, it can be seen that the weight percent ratio of 2,2,3-trimethylbutane to methylhexanes is less in the $SbF_5$ and HF system (Examples III and IV) than in the inventive $SbF_5$ and $CF_3SO_3H$ system (Examples I and II). The difference in selectivity is summarized in Table V.

TABLE V

| Example | Catalyst System | Reaction Temp. °C. | Wt. % Ratio 2,2,3-trimethylbutane/methylhexanes |
|---|---|---|---|
| I | $SbF_5/CF_3SO_3H$ | 25 | 0.21 |
| II | $SbF_5/CF_3SO_3H$ | 0 | 0.17 |
| III | $SbF_5/HF$ | 24 | 0.11 |
| IV | $SbF_5/HF$ | 0 | 0.08 |

EXAMPLE V

A 14.66 g sample of fluorided alumina was placed in a nickel tube reactor. The fluorided alumina was treated with a helium-diluted stream of antimony pentafluoride and the alumina showed a weight gain of 1.32 g corresponding to the absorption of 0.0061 mole $SbF_5$. The reactor contents were then treated with trifluoromethanesulfonic acid with helium purge and the system showed a weight gain of 0.98 g, corresponding to the absorption of 0.0065 mole $CF_3SO_3H$. The catalyst composite contained 15.7 weight percent total of $SbF_5$ and $CF_3SO_3H$ based on the total weight of the supported composition.

A normal hexane isomerization run was carried out over the supported catalyst produced above at about 25° C., 1.0 atmosphere, 4.9 $H_2$ to n-$C_6$ hydrocarbon molar ratio and a gaseous space velocity of 640 V/V/hr. The charge contained 5 mole percent methylcyclopentane based on total hydrocarbon in the feedstock and the average hydrogen flow rate was 107 cc/min.

Chromatographic analyses of the reactor effluent at various times on stream were as follows:

TABLE VI

| Sample No. | Time on Stream, min. | % Conversion n-$C_6$ | 2,2-DMB | DIP & 2-MeC$_5$ | 3-MeC$_5$ | n-$C_6$ |
|---|---|---|---|---|---|---|
| | | | Reactor Effluent, wt.%[a] | | | |
| 1 | 5 | 15 | 2.2 | 10.3 | 2.6 | 84.9 |
| 2 | 20 | 22 | 3.6 | 14.4 | 4.2 | 77.8 |
| 3 | 40 | 27 | 4.4 | 17.1 | 5.1 | 73.4 |
| 4 | 60 | 30 | 4.7 | 19.0 | 6.1 | 70.2 |
| 5 | 85 | 30 | 5.1 | 19.3 | 5.9 | 69.7 |
| 6 | 105 | 31 | 5.2 | 20.3 | 5.9 | 68.6 |

[a]Excluding methylcyclopentane and cyclohexane. 2,2-DMB, DIP, 2-MeC$_5$, 3-MeC$_5$ and n-$C_6$ represent, respectively, 2,2-dimethylbutane; diisopropyl(2,3-dimethylbutane); 2-methylpentane; 3-methylpentane and n-hexane. No products boiling lower than 2,2-dimethylbutane were found.

The above data demonstrate isomerization of n-hexane to more highly branched $C_6$ isomers under the conditions employed

EXAMPLE VI

The catalyst employed in Example V was purged with hydrogen and the isomerization of normal hexane was repeated with an average hydrogen flow rate of 101 cc/minute. The hydrogen to hydrocarbon molar ratio was about 16.8 and the gaseous space velocity was 535 V/V/hr. The other conditions were substantially as employed in Example V. A summary of the gas chromatographic analysis is presented in Table VII.

TABLE VII

| Sample No. | Time on Stream, min. | % Conversion n-$C_6$ | 2,2-DMB | DIP & 2-MeC$_5$ | 3-MeC$_5$ | n-$C_6$ |
|---|---|---|---|---|---|---|
| | | | Reactor Effluent, wt.%[a] | | | |
| 1 | 10 | 48 | 8.3 | 30.3 | 9.2 | 52.2 |
| 2 | 55 | 58 | 10.9 | 35.8 | 10.9 | 42.4 |
| 3 | 85 | 55 | 10.1 | 34.5 | 10.1 | 45.3 |
| 4 | 130 | 57 | 10.8 | 36.0 | 10.7 | 42.5 |
| 5 | 150 | 57 | 10.6 | 36.0 | 10.4 | 43.0 |
| 6 | 165 | 56 | 10.9 | 35.2 | 10.2 | 43.7 |

[a]Components defined in Table VI footnote[a].

No $C_4$ or $C_5$ compounds were detected in the reactor effluent.

These data demonstrate a high level of normal hexane conversion using a lower space velocity and a larger hydrogen to n-$C_6$ molar ratio than were used in Example V.

EXAMPLE VII

A catalyst was prepared as in Example V, and contained 1.20 g (0.0056 mole) $SbF_5$ and 0.96 g (0.0064 mole) $CF_3SO_3H$ (molar ratio $SbF_5/CF_3SO_3H$ was 0.88). The catalyst composite contained 12.9 weight percent total of $SbF_5$ and $CF_3SO_3H$ based on the total weight of the supported composition.

A normal hexane isomerization run was carried out employing this catalyst at about 25° C, 1 atmosphere pressure, 18.0 $H_2$ to n-$C_6$ hydrocarbon molar ratio and a gaseous space velocity of 1050 volumes of gaseous feed per volume of catalyst per hour, at an average hydrogen flow rate of 199 cc/minute.

Analyses of the reactor effluent at various times during the course of the run were as follows:

TABLE VIII

| Sample No. | Time on Stream, hrs. | % Conversion n-$C_6$ | 2,2-DMB | DIP | 3-MeC$_5$ | 2-MeC$_5$ | n-$C_6$ |
|---|---|---|---|---|---|---|---|
| | | | Reactor Effluent, Wt.%[a] | | | | |
| 1 | 0.3 | 41 | 14.5 | 6.3 | 5.5 | 14.7 | 59.0 |
| 2 | 0.8 | 52 | 16.6 | 8.3 | 8.0 | 18.7 | 48.4 |
| 3 | 1.2 | 53 | 17.7 | 8.9 | 7.5 | 19.1 | 46.8 |
| 4 | 16.6 | 42 | 6.8 | 8.0 | 8.2 | 18.9 | 58.1 |
| 5 | 19.8 | 37 | 5.3 | 6.9 | 7.0 | 17.5 | 63.3 |
| 6 | 22.4 | 34 | 4.4 | 6.6 | 6.8 | 16.3 | 65.9 |
| 7 | 24.2 | 29 | 3.6 | 5.7 | 5.5 | 13.8 | 71.4 |

[a]Components defined in Table VI footnote[a].

No $C_4$ or $C_5$ hydrocarbons were detected in the reactor effluent.

EXAMPLE VIII

A 7.50 g sample of alumina was placed in a reactor and treated with trifluoromethanesulfonic acid with helium purge until the system showed a weight gain of 2.03 g, corresponding to the depostion of 0.0135 mole of $CF_3SO_3H$ on the alumina. The alumina and $CF_3SO_3H$ composite contained 21.3 weight percent $CF_3SO_3H$ based on the total weight of the supported composition.

This system was tested for N-hexane isomerization at 25° C and found to be inactive.

It will be evident from the foregoing that various modifications can be made to the method of this invention. Such modifications are considered, however, to be within the scope of the invention.

What is claimed is:

1. A method of isomerizing paraffin hydrocarbon containing from four to 12 carbon atoms which comprises passing said hydrocarbon in a feedstream into contact with a catalyst consisting essentially of $SbF_5$ and $CF_3SO_3H$ on a solid support in the presence of hydrogen.

2. The method of claim 1 in which said feedstream is passed in the gaseous state into said contact and said catalyst is supported on a material selected from the group consisting of fluorided alumina, potassium fluoride on alumina, sodium fluoride, aluminum phosphate, aluminum fluoride, and charcoal.

3. The method of claim 2 in which said feedstream is passed into said contact at a gaseous space velocity within the range of from about 5 to about 5,000 volumes per volume of catalyst at a temperature within the range of from about −80°C to about 100°C at a pressure within the range of from about 0.1 to about 70 atmospheres, hydrogen being present in a molar ratio of from about 0.1 to about 100 moles of the paraffin hydrocarbons.

4. The method of claim 3 in which n-heptane contained in a feedstream is passed into contact with said catalyst at a temperature of about 24°C, about 1 atmosphere pressure, a hydrogen to n-heptane molar ratio of about 16.2 and a gaseous space velocity of about 618 volumes of feedstream per volume of catalyst per hour.

5. The method of claim 3 in which n-heptane contained in a feedstream is passed into contact with said catalyst at a temperature of about 0°C, about 1 atmosphere pressure, a hydrogen to n-heptane molar ratio of about 16 and a gaseous space velocity of about 600 volumes of feedstream per volume of catalyst per hour.

6. The method of claim 1 in which said catalyst comprises $SbF_5$ and $CF_3SO_3H$ in an amount within the range of from about 1.0 to about 40 weight percent of the total $SbF_5$ and $CF_3SO_3H$ based on the total weight of the supported composition.

7. The method of claim 1 in which said catalyst contains $SbF_5$ and $CF_3SO_3H$ in a total amount of about 15.7 weight percent based on the total weight of the supported composition, the molar ratio of $SbF_5$ to $CF_3SO_3H$ is about 0.94 and the paraffin hydrocarbon is isomerized at a temperature of about 25° C., a pressure of about 1 atmosphere, a gaseous space velocity of about 640 and a hydrogen to paraffin hydrocarbon molar ratio of about 4.9.

8. The method of claim 1 in which said catalyst contains $SbF_5$ and $CF_3SO_3H$ in a total amount of about 15.7 weight percent based on the total weight of the supported composition, the molar ratio of $SbF_5$ to $CF_3SO_3H$ is about 0.94 and the paraffin hydrocarbon is isomerized at a temperature of about 25° C., a pressure of about 1 atmosphere, a gaseous space velocity of about 535 and a hydrogen to paraffin hydrocarbon molar ratio of about 16.8.

9. The method of claim 1 in which said catalyst contains $SbF_5$ and $CF_3SO_3H$ in a total amount of about 12.9 weight percent based on the total weight of the supported composition, the molar ratio of $SbF_5$ to $CF_3SO_3H$ is about 0.88 and the paraffin hydrocarbon is isomerized at a temperature of about 25° C., a pressure of about 1 atmosphere, a gaseous space velocity of about 1050 and a hydrogen to paraffin hydrocarbon molar ratio of about 18.0.

* * * * *